United States Patent

[11] 3,609,509

[72] Inventor David Logan Lafuze
 Waynesboro, Va.
[21] Appl. No. 18,539
[22] Filed Mar. 11, 1970
[45] Patented Sept. 28, 1971
[73] Assignee General Electric Company

[54] FEEDBACK CONTROL FOR CYCLOCONVERTER
 19 Claims, 8 Drawing Figs.
[52] U.S. Cl. .................................................. 321/7,
 321/5, 321/18, 321/61, 321/69
[51] Int. Cl. .......................................... H02m 5/30
[50] Field of Search .......................................... 321/5, 7,
 18, 60, 61

[56] References Cited
 UNITED STATES PATENTS

Re. 26,327 12/1967 Peaslee et al. ......... 321/61
3,246,231 4/1966 Clarke ..................... 321/69
3,351,838 11/1967 Hunter ................... 321/11 X 3,419,785 12/1968 Lafuze ..................... 321/5 X Primary Examiner—William M. Shoop, Jr.
Attorneys—I. David Blumenfeld, Frank L. Neuhauser, Oscar B. Waddell and Joseph B. Forman ABSTRACT: The invention relates to a circuit for reducing the magnitude of the feedback in a cycloconverter of the type incorporating a phase controlled rectifier system to provide protection both against high load current and the lagging low-power factor loads which are likely to cause miscommutation of the controlled rectifiers. In the inverting mode, the firing angle for the rectifiers is progressively retarded at high load currents and low-power factors and system perturbations are very likely. The feedback is reduced to protect the system against this eventuality. By sensing both the output current and the phase angle of the output load, the feedback is reduced if either load becomes excessive or if the power factor drops. The power factor and the load current are sensed to produce a pair of signals which are utilized to control an electrically variable resistance element in the feedback path to control the amount of feedback as a function both of the load and of the power factor.

INVENTOR
DAVID L. LAFUZE
BY
ATTORNEY

FEEDBACK CONTROL FOR CYCLOCONVERTER

This invention relates to a feedback control circuit and more particularly, to a circuit in which the amount of feedback for a cycloconverter is controlled in response both to the output load current as well as the load current power factor.

The feedback control circuitry of the present invention has been developed for use with a cycloconverter system of the type described in Reissue Pat. No. 26,327 issued Dec. 19, 1967 on an application filed in the name of Lawrence R. Peaslee and which is assigned to the assignee of the present application. As described in detail, in the Peaslee reissue patent, a cycloconverter converts AC power at one frequency or varying frequency to AC power at another fixed frequency. Such frequency conversion systems include a power source of varying frequency which may be a generator driven by a variable speed drive to produce an output voltage of a frequency proportional to the speed of the driving source. For example, the generator may be driven from a power source such as the engine of an aircraft the speed of which varies unpredictably over a relatively wide range of speeds. The varying frequency output voltage from the generator is supplied to a load, which requires a fixed, lower frequency voltage, through a number of controlled switching devices which are gated into conduction in a selected and programmed manner in response to a reference frequency signal to produce the desired output frequency for the load.

In a cycloconverter system of the type using phase controlled rectifiers, the constant frequency output signal is generated by adding up segments of the varying frequency input by firing the controlled rectifiers at various phase angles of the input signal with the phase angle chosen as a function of a reference of the same frequency as the desired output frequency. One or more feedback loops may be provided between the converter output and input to supply feedback signals proportional to such parameters as harmonic content of the output wave in order to correct the wave shape, the amount of DC in the output, and the amplitude of the output signal with load variations.

Each of these feedback loops, however, may, under certain critical operational circumstances, introduce certain instabilities into the system which may cause miscommutation of the controlled rectifiers in the cycloconverter. Since the constant frequency output is produced by firing the controlled rectifiers at various phase angles of each of the source voltage alternations, it is clear that the firing point of the rectifier is cyclically advanced and retarded. As the firing point is retarded, it is possible to fire the rectifier so late in the cycle that the rectifier cannot be turned off again, thereby producing a miscommutation. For each controlled rectifier therefore, there is a point in the cycle beyond which it should not be fired because there is not sufficient time in the cycle to commutate the rectifier, i.e. to turn it off and transfer conduction to another rectifier in the bank, Specifically, as the load increases in a cycloconverter system as the cycloconverter rectifier bank which is operating in the inverting mode tries to transfer power later and later in the cycle of the generator supply voltage. As a result, the time that remains to turn off the conducting rectifiers before the line to line voltage from the generator reverses, is progressively reduced so that the system is sensitive to any disturbance which can then cause miscommutation. Similarly, with lagging power factors, (i.e., an inductive load is present, as for example, where a motor is driven from the power source) the inverting rectifiers of the cyclcoconverter are fired later and later in the generator cycle. Thus, at high loads, or low power factors, the firing point of the inverting rectifiers comes late in the cycle and begin to approach the critical point where miscommutation may result. It is under these circumstances that the feedback loops may introduce enough instability and jitter into the system to cause the rectifier to fire beyond the critical point thereby causing a miscommutation which obviously affects the wave shape characteristics of the converter output and which may also damage the rectifier.

Accordingly, it is an object of the present invention to provide a closed loop system in which the amount of feedback in the loop is reduced as a function both of the load magnitude and power factor.

A further objective of the invention is to provide a closed loop cycloconverter feedback system which is controlled in response both to the magnitude of the output load and its power factor to reduce or eliminate miscommutation of the cycloconverter rectifiers.

Still another objective of the invention is to provide a cycloconverter system in which the amount of feedback is selectively reduced in response to both the output load magnitude and the load power factor for any combination of load and power factor conditions.

A still further objective of the instant invention is to provide a cycloconverter the description in which the feedback is controlled in response to both the output load magnitude and the power factor in which the power factor of the load is sensed by sampling the magnitude of the generator current which supplies the input to the cycloconverter.

Still other objectives and advantages of the instant invention will become apparent as the description thereof proceeds.

The various advantages of the instant invention are realized by providing a cycloconverter system in which one of the feedback paths, and particularly a high-gain feedback path utilized for wave shaping, is controlled by means of an electrically variable resistive element such as a field effect transistor (F.E.T.) the magnitude of which is controlled in response to the summation of two signals representing respectively the magnitude of the load current and the power factor of the load current. The field effect transistor acts as a variable resistance element in the feedback path which shunts more or less of the feedback signal to ground, thereby reducing the amount of feedback as a function of these two signals. To simplify the overall system, the signal representing the power factor of the load is derived by sensing the magnitude of the generator current supplied to the converter since it has been found that the magnitude of this current is directly related to the power factor of the output load. In this fashion, a direct and simple method for producing a signal proportional to the power factor may be achieved. These two signals representing both the magnitude and the power factor of the output load are applied to the field effect transistor to vary its resistance as a function of these two parameters. By combining these two signals, the calibration or reference point of the transistor is varied for various combinations of the load and power factor. That is, the operating point of the field effect transistor at which its resistance begins to change, is changed to accommodate various combinations of load and power factor so that the feedback varying variable resistance element is in effect recalibrated for various combinations of power factor and load.

These and other objects and advantages will be more readily understood from the following detailed descriptions of the invention and the accompanying figures in which.

Figure 1:
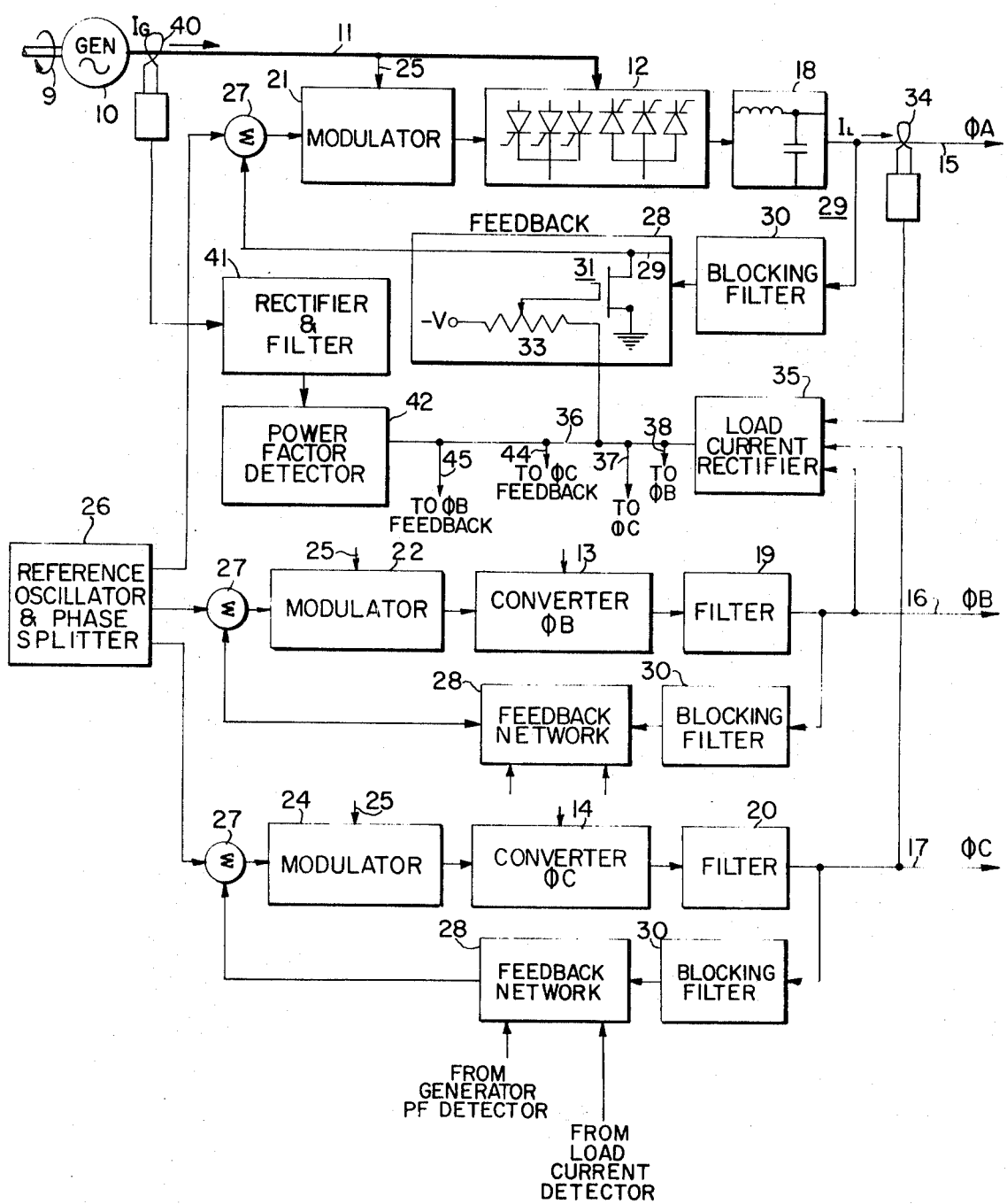
FIG. 1 is block diagram of a cycloconverter system including a feedback reducing means of the invention.
Figure 8:
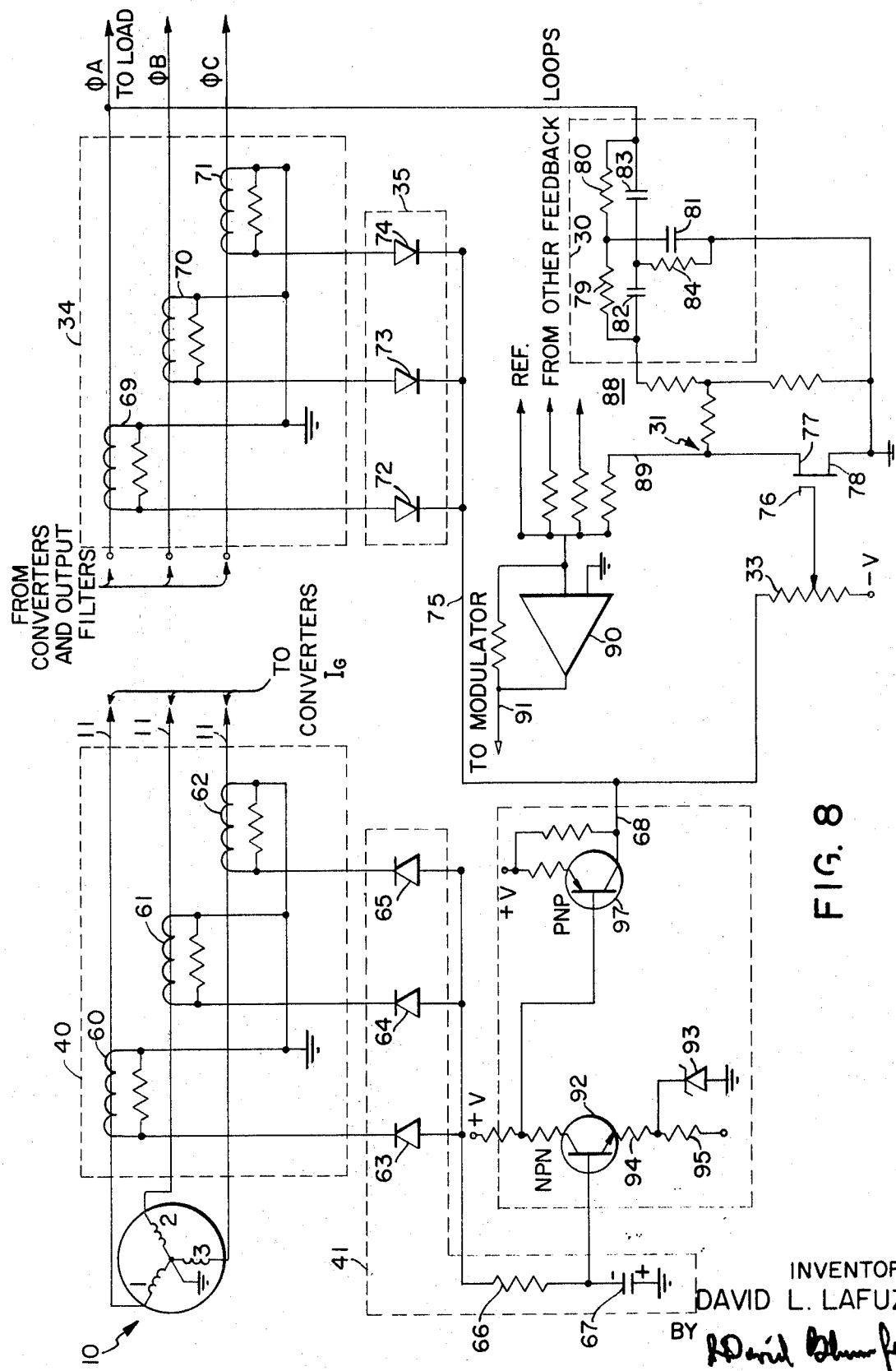

FIG. 8 is a schematic diagram of a portion of the overall system of FIG. 1 illustrating the various circuits for producing the signals representative of the current load and power factor and the manner in which they are utilized to control the feedback of the cycloconverter. 40 In the various drawings, presently to be described, like reference numerals refer to like parts throughout. FIG. 1 shows a block diagram of a cycloconverter system including the feedback controlling circuit of this invention, being a block diagram, FIG. 1 shows the relationship of the various elements of the cycloconverter system to the feedback controlling arrangement of the instant invention. A more detailed description of a cycloconverter in which the feedback controlling circuit may be utilized, is set forth in the aforementioned Peaslee Pat. No. RE 26,327.

FIG. 1 shows a power source such as a generator 10 driven by a mechanical driving source such as the shaft 9 which may be coupled, for example, to the engine of an aircraft. The shaft 9 drives the generator at the engine aircraft speed and therefore produces an output from the generator which is of a frequency proportional to the speed of the driving source. The output of generator 10 is coupled to cycloconverters shown generally at 12, 13 and 14 over a power line 11. The cycloconverter shown in FIG. 1. is a three-phase input to a three-phase output system and includes two sets of silicon controlled rectifiers as the switching devices utilized in the cycloconverter each set being so poled as to conduct respectively during the positive and negative alternations of the generator output. Thus, one set of three controlled rectifiers (which hereinafter will be referred to as SCR's) are poled to conduct the positive alternations of the generator output and the other set of SCR's are poled to conduct the negative half-cycles of the generator output. The output of the SCR's in each converter stage are combined and filtered to produce three-phase outputs, ΦA, ΦB, and ΦC, at conductors 15, 16 and 17. To this end, L-C filters 18, 19 and 20 are coupled between the output of the cycloconverters 12–14 ad output lines 15–17. The conduction of each SCR in a converter stage is controlled by a modulator or firing circuit associated with each converter stage. Thus, modulator 21 is associated with converters stage 12, modulator 22 with converters stage 13 and modulator 24 with converter 14. Conductors 25 supply the varying frequency generator output to each of the modulators. The firing signals for each of the SCR's in a converter stage are positioned in time as a function of a reference signal, derived from a reference oscillator and phase splitter shown at 26. The reference signal is combined in a summing network shown generally at 27 with a feedback signal produced by the feedback loops 28 coupled between the output of each converter and the summing network to provide input signal which is applied to modulators 21 through 24. The combination of the reference signal and the feedback signal are applied to the modulator to produce therein, as will be explained in greater detail later, the triggering signals for the SCR switching devices in each of the converter stages to cause each of the SCR's to conduct for a predetermined time interval.

Also shown in FIG. 1 is a circuit for controlling the amount of the feedback in each of the cycloconverter phases as a function both of the output current load and the load power factor. Thus, each feedback network as shown generally at 28, includes a variable resistance element which shunts the feedback path and which will, in response to signals representing both the load current and the load power factor shunt more or less of the feedback signal to control the amount of feedback as a function both of the output current magnitude and the output power factor. A feedback signal is coupled over conductor 29 to blocking filter 30 which blocks the fundamental frequency component but transmit the various harmonics of the output frequency such as the 3rd and 5th harmonic. The harmonics are transmitted through feedback network 28 back to the modulator to provide waveform correction for the converter output to minimize the harmonic content of the output. Included in feedback network 28 is a feedback reducing resistive element comprising a field effect transistor 31 (hereinafter referred to as F. E. I.) which has its drain and source electrodes connected between the conductor 29 and ground. A control electrode 32 is connected to a tap on potentiometer 33. Two signals representing respectively the magnitude of the output load current and the load power factor are impressed on the potentiometer. The potential at gate electrode 32 controls the resistance of the F.E.T. there by varying the amount of the feedback signal that is shunted to ground. The resistance of F.E.T. varies from a very high resistance in the order of several hundred thousand ohms, to a very low resistance, in the order of several hundred ohms. With a resistance of several hundred thousand ohms, the F.E.T. appears like an open circuit and the full feedback signal is transmitted over line 29 to summing junction 27. As the resistance of the F.E.T. is reduced, more and more of the feedback signal is shunted to ground thereby reducing the amount of feedback applied to summing node 27 of the converter.

A unidirectional signal proportional to the load current is produced by rectifying the load currents in a rectifier 35 which has its input coupled to the output lines by means of current transformers such as the one illustrated schematically at 34. The output of rectifier 35, a unidirectional voltage proportional to the average load current flowing in lines 15, 16 and 17. This signal is applied to one end of F.E.T. control potentiometer 33 and through leads 37 and 38 to the corresponding F.E.T. feedback controlling devices in feedback networks 28 associated with converters 13 and 14. The signal proportional to load power factor is derived by sensing the generator current at the output of generator 10 through a current transformer 40 and applying this signal to a rectifier and filter 41 to produce a unidirectional voltage proportional to the average generator current flowing in each of the three-phase output lines from generator 10. This unidirectional output voltage is then applied to a power factor detector circuit 42 in which the unidirectional voltage representing generator current is applied to and compared with a reference voltage proportional to the magnitude of the generator current at rated load current load and predetermined power factor. Circuit 42 produces an output signal if the power factor is less than the predetermined power factor and this signal is applied to the upper end of F.E.T. control potentiometer 33 in network 28 associated with converter 12.

As will be pointed out in greater detail later, the magnitude of the generator current $I_g$ flowing in output lines 11 is directly related to the power factor of the load current $I_L$ flowing in lines 15, 16 and 17. Therefore, by measuring the magnitude of this current, it is possible to determine what the load power factor is. Furthermore, by comparing the generator current signal to a reference power factor, detector circuit 42 produces a signal which is proportional to the difference between the instantaneous generator current and the magnitude of the generator current for given load and given power factor. This signal is then utilized to control the amount of feedback in the feedback network for varying combinations of load and power factor. That is, the higher the power factor, the higher the load current must be before the feedback reducing circuit is brought into operation. However, as the power factor drops, the problem of phase retardation of the SCR's and the problem of miscommutation becomes more crucial, then feedback reduction must take place at lower loads. By adding a control voltage which is proportional to the amount the load power factor differs from, a predetermined load power factor, the operational range of the F.E.T. is recalibrated so that the F.E.T. will act to reduce the feedback at lower and lower loads as the power factor is reduced. In this fashion, the feedback can be controlled for any combination of load and power factor to insure that the gain of the loop is reduced in such a manner that instabilities or preturbations in the loop which are likely to produce miscommutations of the SCR's are avoided.

Figure 2:
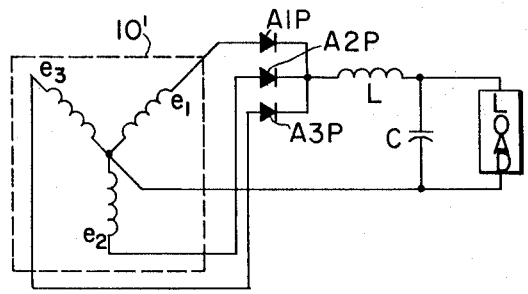
FIG. 2 is a schematic diagram of a phase controlled rectifier system.

For a fuller understanding of the need for a feedback reducing network for a cycloconverter in response both to load factor and power factor, it is necessary to understand fully the fundamentals of cycloconverter operation. To this end, reference is made to FIGS. 2, 3, 4 and 5. FIG. 2 shows a simple phase controlled rectifier circuit including a three-phase generator 10' which is the equivalent of generator 10 shown in FIG. 1. The Phase 1 output of generator 10' is designated as $e_1$ and is coupled to the load by an SCR designated as A1P. Similarly, generator outputs $e_{2 \text{ the generator and }} e_3$ are coupled to the load by corresponding SCR's designated A2P and A3P, where the first letter, i.e. A, represents the phase output of the system, the number succeeding the first letter stands for the generator phase winding to which the switch is connected, and the trailing letter designates that the switching device is in the positive bank, i.e. those which conduct positive current. The generator output is coupled to the load by each of the SCR's through an output filter consisting of a series inductor L and shunt capacitors C and correspond to the filtering network shown generally at 18, 19 and 20 in FIG. 1 of the drawings.

In describing the operation of this phase controlled rectifier cycloconverter arrangement, a number of assumptions will be made which generally hold true for the system with certain limited exceptions which are not important here. These assumptions are as follows:

1. The generator 10' is a stiff source of three-phase sinusoidal power so that the voltage at its terminals does not drop as current is drawn from the generator.
2. The SCR's are perfect switches, i.e. they turn on instantly when gated, there is no forward voltage drop and they carry no reverse current.
3. Inductor L and capacitor C are sufficiently large so that the voltage across the load as each SCR conducts is a smooth direct voltage.
4. The load is a back electromotive force (back e.m.f.) load the magnitude of which is equal to the average direct voltage from the phase controlled rectifier.

Figure 3:
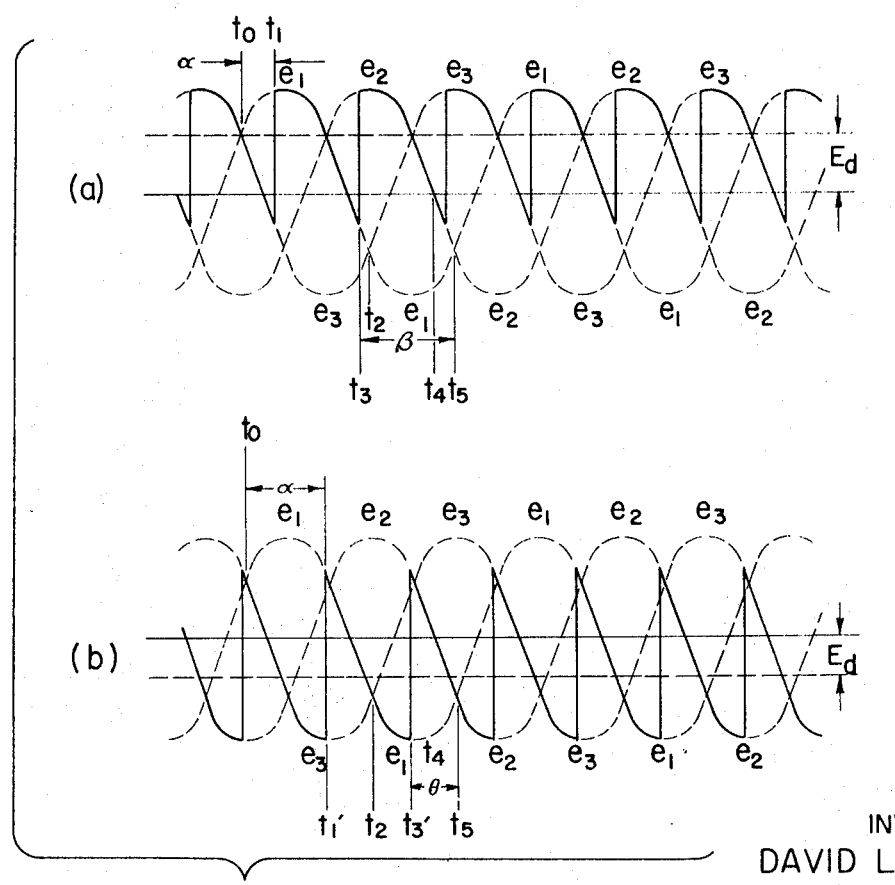
FIGS. 3, 4 AND 5 are waveforms useful in understanding the operation of the phase controlled rectifiers forming part of the cycloconverter system, and the manner in which the output waveform is reconstructed.

The operation of the phase controlled rectifier circuit of FIG. 2 is best understood from a consideration of the waveforms appearing shown in FIGS. 3(a) and 3(b). This figure portrays a composite wave consisting of three sine waves $e_1$, $e_2$, and $e_3$, representing the three-phase output of the generator 10'. The sinusoidal generator output voltage waves are shown as dashed lines form the portion of the generator voltage conducted by the SCR's A1P, A2P and A3P are shown by means of solid lines. That is, each SCR is turned on at some fixed point in the cycle of the generator voltage and conducts for a fixed period of time determined by the firing angle for the SCR. Thus, for example, if SCR A3P is conducting, SCR A1P can be turned on any time after the voltage $e_1$ becomes more positive than the voltage $e_3$. As shown in FIG. 3, this period begins at a time $t_0$ and ends at a time $t_2$ when the line to line voltage again becomes such that SCR A1P no longer can be fired. In other words, SCR A1P as well as the other SCR's can be turned on whenever the line to line voltage establishes a positive voltage at the anode of the SCR with respect to its cathode. The phase angle at which the SCR is fired is shown in FIG. 3 as an angle $\alpha$. In FIG. 3, $\alpha$ is shown as being equal to approximately 50° measured from $t_0$. At firing angle $\alpha=50°$ the average rectified output voltage $E_d$ from the phase controlled rectifier is positive with the level of this voltage, of course, being the integral of the area under wave $e_1$ from time $t_1$ to $t_3$ when SCR is commutated off.

FIG. 3(b) on the other hand, illustrates a situation where $\alpha$ is retarded sufficiently so that a negative average output voltage $E_d$ is produced. Thus, in FIG. 3(b) a firing angle of 118° is illustrated, i.e. $\alpha=118°$ and it can obviously be seen that the area under the $e_1$ from $t_1'$ to $t_3'$ below the 0 line is greater than the area above the line so that the average output voltage $E_d$ is negative. Thus, it can be seen that a maximum positive average voltage output is obtained when each SCR is switched on as early as possible in the cycle, as for example, at $t_0$ so that $\alpha=0°$. As the phase angle $\alpha$ is increased, (i.e. firing point retarded) the average voltage becomes less positive, and in fact, when the SCR s are fired at $\alpha=90°$, the average voltage output is 0. As the phase angle is retarded beyond 90° the average voltage output $E_d$ becomes negative and reaches a maximum negative value when each SCR is switched on at the last possible point in each cycle such as just prior to the time $t_2$, i.e. just before the line to line voltage across the particular SCR is no longer positive. If the SCR's A1P, A2P and A3P are fired at varying phase angles, the average voltage output from the phase control rectifiers varies correspondingly at a rate determined by the rate at which the firing angle of the SCR's is advanced or retarded, and a polarity depending on whether the angle of retardation is more or less than 90°.

Figure 4:
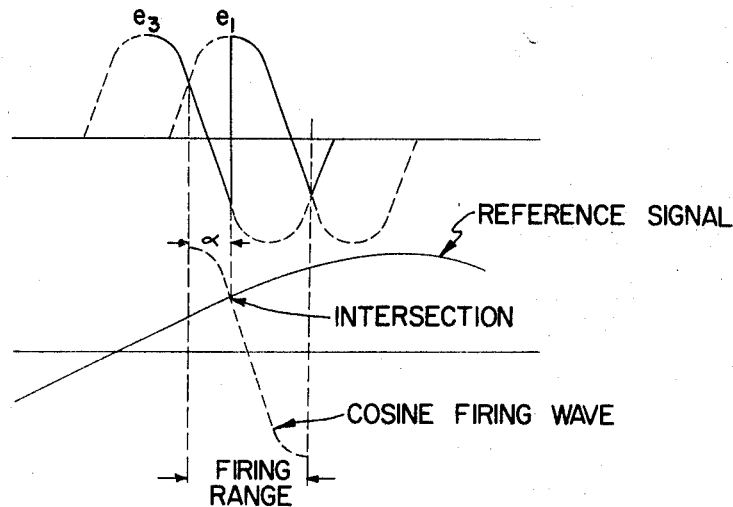

FIG. 4 illustrates how reference signal from the oscillator 26 is combined with the generator output in modulators 21, 22 and 23 to achieve the cyclical variations of the phase angles which the SCR's shown in FIG. 2 are fired. The generator output sinusoidal waves that are coupled to the modulators are converted from a sine to a cosine wave for each of the generator output phases. This conversion of the signal from a sinusoidal to a cosine sinusoidal form is necessary in order to produce a linear relationship between the generator voltage and the rectified output $E_d$. For a further discussion and description of the manner in which this conversion takes place, and the reason for having such a conversion, reference is hereby made to U.S. Reissue Pat. No. 26,630 issued in the name of Lawrence R. Peaslee on July 15, 1969 and assigned to the assignee of the present invention which contains a detailed description of this particular feature of the converter. The cosine wave is combined with the reference signal, which is substantially lower in frequency than the the siusial generator output voltage so that a large number of generator alternations occur during each cycle of the reference wave. A triggering pulse is produced at the point of intersection of these two signals which triggering pulse is utilized to trigger an SCR such as A1P into conduction. Suitable circuitry for producing triggering pulses in response to the intersection of the reference and the generator voltage output waves are well known. Reference is hereby made to U.S. Pat. No. 3,400,321 issued Sept. 3, 1968 in the name of David L. Lafuze entitled "Protective Circuitry for Frequency Converter Systems," which patent is also assigned to the assignee of the invention, and which describes and shows (see FIG. 3) such a circuit.

It will be apparent from FIG. 4 that as amplitude of the reference signal increases or decreases, the point of intersection with the cosine wave advances or is retarded. The significance of this relationship is twofold. First, it is apparent that during one cycle of the reference signal, there is a continuing change of amplitude of the reference signal so that the firing angle for the cosine sinusoidal waves, advances and retards at the same rate as the reference signal. Since the average voltage passed by the SCR's varies with the position of the firing angle for each cycle of the generator voltage, it can be seen that the cycloconverter output frequency is the frequency of the reference signal since the amplitude varies in accordance with this reference signal frequency.

Furthermore, as the amplitude of the reference signal is varied by applying suitable bias, control and feedback voltages, the firing angle may be similarly controlled to vary the output voltage as desired.

Figure 5:
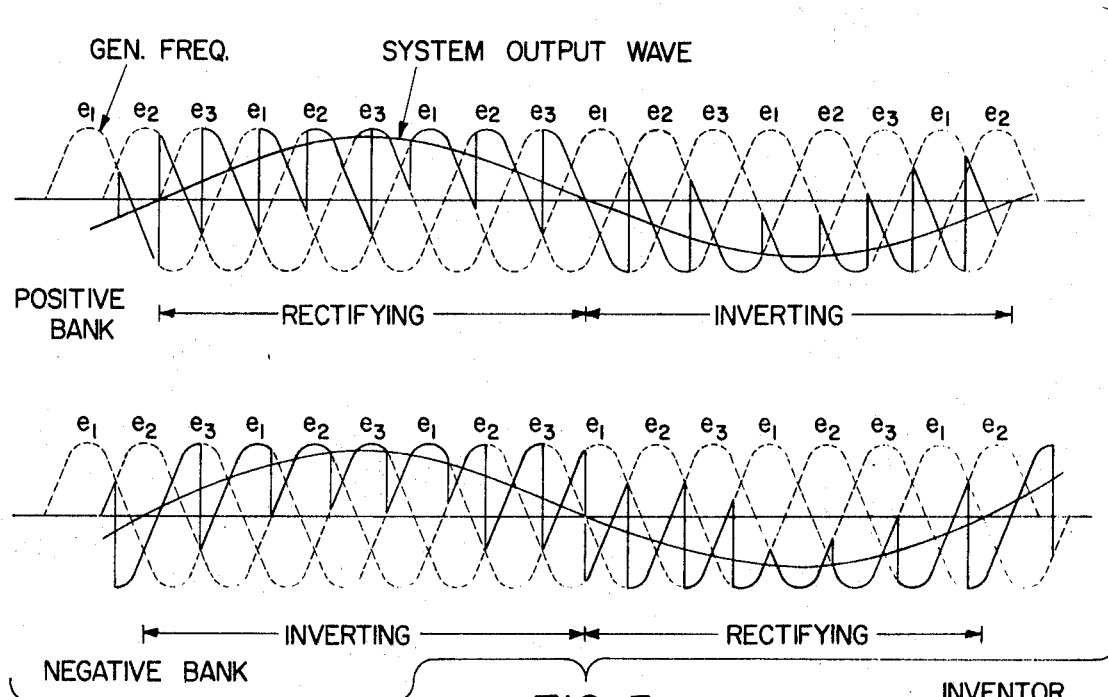

FIG. 5 shows how rectifier banks of the type illustrated in FIG. 2 can be utilized to produce an output wave of a predetermined frequency from a higher varying frequency input wave by the controlled phase retardation and advance of the SCR's in the bank. FIG. 5 shows in solid line the resulting output from the phase controlled rectifiers of FIG. 2 when the SCR s are fired at different angles, with the angle of firing for each of the generator cycles being controlled by an alternating reference voltage such as the reference signal from the oscillator 26 of FIG. 1. Since a cycloconverter produces an AC output, another bank of SCR's not shown in FIG. 2, responsive to the negative higher cycles of the generator output is coupled to the positive bank shown in FIG. 2 to complete the frequency converter. That is, another set of 3 SCR's must be connected between generator 10' and the LC filter and load of FIG. 2 with the SCR's being so poled as to be responsive to the negative alternations of the output voltage of the generator. These SCR's would correspondingly be denominated as A1N, A2N, A3N to indicate that they are the various SCR's for these out in the negative bank of the converter It will also be noted from an examination of FIG. 3 and 5 that when the firing angle is retarded beyond 90°, the average voltage output of the positive SCR bank is negative. Where the output of the controlled rectifiers is negative, even though the SCR's are conducting, the phase controlled rectifier is said to be inverting in that the power transfer is from the load to the source and back to the SCR's. This period of time is shown in FIG. 5 as an inverting operation. It should also be noted that the negative bank of SCR's is inverting (i.e. its output is positive) when the positive bank is rectifying and vice versa.

Coming back again to FIG. 3, it has been established that the SCR A1P can be turned on at any time from $t_0$ when the line to line voltage across the SCR becomes positive, to a point $t_2$ where the line to line voltage across A1P again becomes negative. If, SCR A1P has been turned on during this interval, it can be turned off or commutated off at any time before the generator voltage $e_1$ again becomes more positive than the generator phase voltage $e_2$, at time $t_5$. This is so because the SCR A1P is commutated or turned off by the switching on of SCR A2p. That is, when SCR A2P is turned on, its anode to cathode resistance becomes very low and the voltage drop across A2P is very low. Hence, A2P essentially connects the cathode of A1P to the now positive $e_2$ voltage thereby applying a positive voltage to the cathode of SCR A1P reverse biasing the anode-cathode path and turning SCR A1P off. The latest point in time at which SCR A2P can be turned on to commutate A1P off, is at which is the latest time that A2P can be turned on, i.e. $t_5$ before $e_2$ becomes more negative than the voltage $e_1$. It is clear therefore, that an interval of time exists between the time $t_5$, which is the last time at which SCR A1P can be turned off, and the interval when the SCR is actually turned off. This interval, which is known as a turnoff or commutation phase angle $\beta$ is measured from time $t_5$ to the actual turnoff time which in FIG. 3, for example, as shown is $t_3$. In the instance of FIG. 3 where the firing angle of $\beta$ is 50° the commutation angle $\beta$ is quite large. It will also be apparent that $\beta$ will vary in a manner depending on firing angle $\alpha$. Obviously, if the firing angle for SCR A2P is retarded so that SCR A2P does not fire at $t_3$, but fires later in the cycle, commutation angle $\beta$ is reduced proportionately. This, it will be apparent, can introduce problems when the firing angle $\alpha$ is retarded sufficiently so that the angle $\beta$ becomes smaller and smaller. As $\alpha$ increases and $\beta$ becomes smaller, a critical point is reached where further retardation makes it impossible to commutate or turn the conducting SCR off since insufficient time is left to go through the turnoff procedure. As a result, the SCR instead of being commutated off continues to conduct resulting in a distortion of the output waveform and also the possibility of damage to the SCR because of the continuous current flow. This failure to turn off the SCR is called a miscommutation and results in the undesirable characteristics described above.

The phenomenon of miscommutation can occur under a number of different conditions. For example, under heavy overload conditions, that is, when the load is drawing currents which are substantially in excess of the rated load for the system, or in the event that the load is a very low power factor load, miscommutation may result. Thus, in an overload condition, the normal reaction of the cycloconverter is to attempt to maintain the output by increasing the reference signal through the feedback loop. This increase in the reference signal which may take the form of a DC bias or the like, advances the time at which the nonconducting ones to the SCR's will be turned on in the rectifying mode. That is, the angle $\alpha$ is advanced so that the SCR is fired at an angle which is closer to $t_0$ than previously. On the other hand, the increase in the reference signal will retard the turn-on time when the circuit is in the inverting mode. It is this latter fact that can cause a severe problem with respect to miscommutation. If the generator supplying each of the SCR's had no inductance so that there is no stored energy in the system, the time necessary to commutate a conducting SCR is limited only by the time that it takes the SCR to resume its forward blocking state, a period of time which is in the order of microseconds. However, the generator which is the power source for the cycloconverter and its phase controlled rectifiers is not a device which has no inductance. In fact, a generator presents a substantial inductance in series with each of the SCR's as shown in FIGS. 2 by the windings forming part of the generator. These inductors, of course, store energy so that a finite number of volt-seconds are necessary to discharge this energy through the rectifier. As long as this stored energy is not discharged, this energy maintains the SCR in the conducting state and prevents turnoff. With an overload condition, the firing angle $\alpha$ of the SCR's operating in the inverting mode is retarded more and more so that these SCR's may be turned on so late in the generator cycle that there is insufficient time in terms of volt-seconds to discharge the energy stored in the generator inductance associated with the SCR which is then conducting. For example, going back to FIG. 3(b) at $t_1'$ SCR A1P is triggered into conduction. If, because of an overload, SCR A2P is turned on at time $t_4$ instead of $t_3'$, the amount of energy that can be discharged from the inductance of $e_1$ between $t_4$ and $t_5$ is substantially reduced and is much less than the energy that can be discharged if the commutation of the SCR is initiated at $t_3'$. If this energy has not been discharged by $t_5$ so that SCR A1P is still conducting, SCR A1P continues to conduct since line-to-line voltage $e_1$ is now positive again, and attempts to turn off SCR A2P instead. Thus, due to the energy stored in the inductance ahead of the rectifier and the fact that for the SCR's in the inverting mode $\beta$ has been reduced below a critical value, SCR A1P will continue to conduct.

For any given generator, of course, the inductance for each phase is either known or can be determined. Similarly, the turnoff time required for the SCR, the maximum current which must be commutated successfully and the amplitude of the generator voltage are all known so that it is possible to determine by calculation the time interval necessary to discharge the generator inductances. This time, therefore, establishes the minimum or critical value of the commutation angle $\beta$ for any particular cycloconverter system. That is, the commutation angle $\beta$ must exceed this critical value in order for successful commutation to take place. Stating it conversely, the firing angle $\alpha$ in the inverting mode cannot exceed a given angle in order that the critical or commutation angle $\beta$ turnoff not be exceeded.

In a cycloconverter system of the type illustrated in FIG. 1, the presence of a high-gain feedback loop such as the one illustrated at 28 under certain conditions, introduce problems which complicate the commutation process which must take place. That is, if one of the feedback loops has a sufficiently fast response time and sufficiently high gain, it may introduce disturbances and perturbation into the system as the cycloconverter approaches the critical $\beta$ angle and these perturbations may be sufficient to cause the critical $\beta$ angle to be exceeded resulting in a miscommutation. That is, when the system is operating under normal circumstances, when the power factor is high and the load is not excessive, the system is operating at $\beta$ angle which is sufficiently removed from the critical $\beta$ angle so that any disturbances or perturbations introduced by a very fast and high-gained feedback loop, such as the one which is utilized to correct the wave shape by cancelling harmonics, do not sufficiently affect the system to drive it into the critical miscommutation area. However, with certain combinations of load and power factor, the system approaches the critical $\beta$ angle and any system perturbation or disturbance may be sufficient to drive the system beyond the critical $\beta$ angle and cause miscommutation. Consequently, some means must be provided for sensing both the load and power factor so that the amount of feedback is reduced and the system operated at a lower but more stable feedback level whenever operating conditions are such that the critical $\beta$ angle is approached. In other words, a tradeoff takes place in that it is preferable to accept a poorer waveform by reducing the feedback in order to insure a system which is stable and will operate properly. This is achieved, by including an electrically variable resistive element such as a field effect transistor in the feedback path and controlling its resistance to shunt a portion of the feedback signal to ground.

The F.E.T. is controlled by two signals which represent respectively the load current and load power factor. The two signals control the resistance of the F.E.T. over different ranges so that at high power factors, the F.E.T. does not reduce feedback until a substantial overload condition exists. On the other hand, for low-load power factors, the operating range of the F.E.T. is shifted so that feedback reduction begins lower load levels. Thus, for example, at a unity power factor the system is calibrated so that the F.E.T. is not effective to reduce the gain of the feedback loop until the output load currents exceed 1.25 of rated load. On the other hand at 0 power factor, the two signals initiate operation of the F.E.T. so that it becomes operative and begins to reduce feedback as soon as the load current exceeds one-half of rated load. Similarly, for intermediate power factors, the F.E.T. begins to reduce the feedback at different values of the load current.

Figure 6:
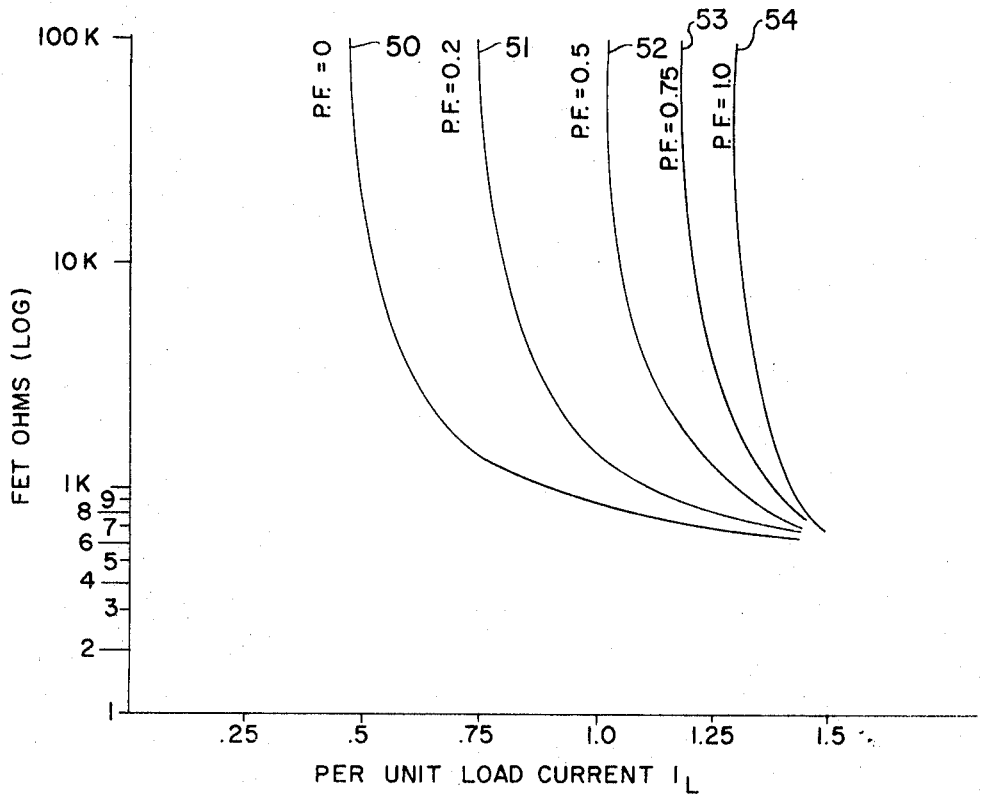
FIG. 6 is a graph showing the relationship between the generator current, load and load power factor which relationship is used in producing a signal proportional to the load power factor from the generator current.

The manner in which it is to be achieved, and the characteristic of the field effect transistor recalibration may be more easily understood by referring to the graph of FIGS. 6 in which the load current in terms of per unit load, where per unit load is defined as the rated load, is plotted along the abscissa and the field effect transistor resistance in ohms is plotted on a logarithmic scale along the ordinate. The resistance of a typical field effect transistor device ranges from several hundred thousand ohms to several hundred ohms, i.e. a range of three orders of magnitude with the resistance of the source-drain path being controlled by the voltage applied to the gating electrode. At gate voltages below cutoff, the resistance of the device is extremely high in the order of several hundred thousand ohms. As the voltage applied to the gate becomes more positive, the resistance of the device drops until at its opposite extreme it may be only several hundred ohms. As shown in FIG. 6, the operating point of the field effect transistor is to be controlled in such a manner that the resistance of the device operates over a series of ranges as represented by the curves 50, 51, 52, 53 and 54. Thus, curve 50 represents the operational characteristics for a 0 power factor load, curve 51 for a 0.2 power factor load; curve 52 at 0.5 power factor load and curve 53 at 0.75 power factor load and curve 54 a unity power factor load. It can be seen that for a 0 power factor load, the F.E.T. must reduce the feedback as soon as the output load current exceeds 0.5 rated load, that is for a 0 power factor load, the sum of the signals from the load and power factor sensing circuits at 0.5 of rated load and beyond, is sufficiently large to cause the resistance of the field effect transistor to drop rapidly and shunting more and more of the feedback signal to ground. As soon as the load reaches 0.75 of rated load at 0 power factor, the resistance of the field effect transistor is approximately 1,000 ohms and substantially all of the feedback signal shunted to ground and the feedback signal applied to the converter is reduced substantially to stabilize the converter. By thus reducing the feedback the system is stabilized and the possibility of system perturbations due to the feedback are substantially minimized. The remaining curves illustrate the operating characteristics of the feedback reducing F.E.T. and show that as the power factor increases, the load current can be permitted to go to higher levels before reduction of the feedback again is initiated. Thus, a family of curves is shown each representing operation over a given range of output load currents for various load power factors. The curves are obviously exemplary only in that additional similar curves for different power factor load relationships are possible.

Figure 7:
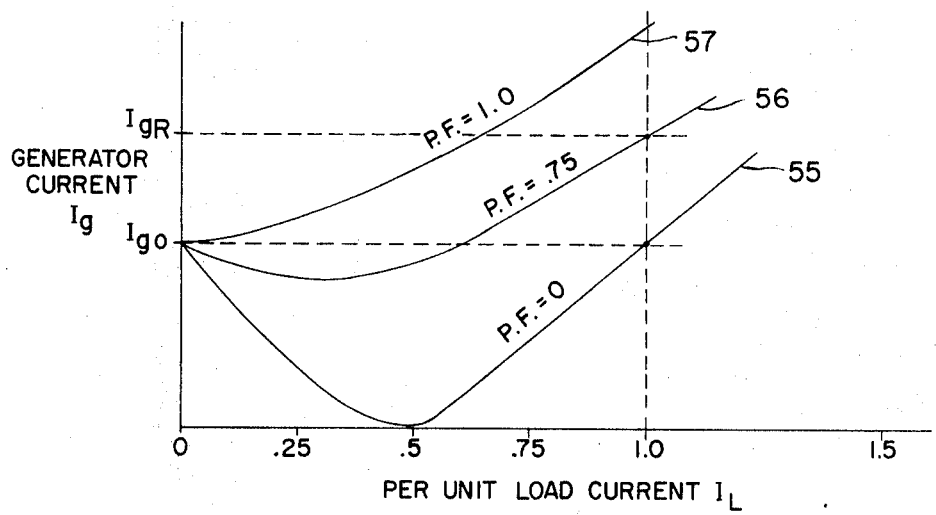
FIG. 7 is a graph showing the resistance characteristics of the field effect transistors for various output loads and power factors.

The manner is which a signal proportional to the power factor may be obtained according to the instant invention may perhaps be best understood by reference to the curves of FIG. 7 which illustrates the relationship of the generator current and the load current for various load power factors. This relationship may then be utilized to produce a signal which is proportional to the power factor without actually measuring the phase angle between the load voltage and the current. That is, by measuring the generator current, it has been found a signal proportional to the load power factor may be obtained in a very simple and indirect way without having to resort to the complex measuring schemes for determining the phase angle between the voltage and current at the output. Thus, in FIG. 7, there is plotted along the abscissa, the magnitude of the load current which is flowing. The generator current $I_g$ for these various levels of load current is plotted along the ordinate and a plurality of exemplary curves 55, 56 and 57 illustrate the relationship between the generator and the load current for various power factors. Curve 55 illustrates the relationship between the load and generator currents for a 0 power factor load; curve 56 for a 0.75 power factor load and curve 57 for a unity power factor load. Similar curves for varying values of power factor may be plotted, but for simplicity of illustration and explanation, these are not shown. Curves 55 and 57, representing 0 and unity power factor respectively, obviously represent the two extreme conditions for the system whereas curve 56 at a power factor of 0.75 is chosen as a typical reference power factor with respect to which the system operates so that at power factors below 0.75 the F.E.T. is recalibrated and its operating point shifted so that the feedback reduction is initiated for lower load levels.

Curve 55 which illustrates the relationship the generator and load current for a 0 power factor load, will perhaps illustrate most clearly the nature of the relationship and manner in which the magnitude of this generator current provides and indication of the power factor load. As shown by curve 55, at no load current $I_g 0$ flows from the generator. It will be appreciated that this current which flows even though no load current is flowing essentially, represents the capacitor current which the cycloconverter supplies to the filter capacitor in output filter 18 of FIG. 1. That is, even with no output a leading current of a magnitude of $I_g 0$ flows as the cycloconverter supplies current to the filter capacitor. If a 0 power factor load such as a purely inductive load, for example, is connected to the output of the cycloconverter, the generator current is initially reduced due to the fact that the lagging current produced by the inductive load is 180° out of phase with the leading current supplied by the generator to the filter capacitor and cancels the generator current. The generator current is reduced until it goes to approximately 0 at 0.5 per unit load. That is, when inductive load equals the impedance of the filter capacitor, the load and filter capacitor form an antiresonant circuit across the output of the cycloconverter, the impedance of which is very high, so that the current drops to 0. Another way of looking at it is that at 0.5 load per unit the lagging inductive current exactly equals the leading capacitor current to the capacitor filter so that the generator current is cancelled. As the load increases beyond 0.5 per unit load, the generator current begins to increase again. It will be understood that as the output load increases beyond 0.5 per unit, the lagging current now drawn by the load exceeds the leading capacitor current initially drawn so that the converter output current becomes a lagging current. The generator current now again increases until at 1.0 per unit load (i.e. rated load) the generator current again is equal to $I_g 0$. Therefore, as soon as the output load exceeds 0.5 per unit load, the converter current is lagging and the firing angle $\alpha$ for the inverting SCR is retarded further and further as the load increases. Hence, for a zero power factor load, the amount of feedback should be reduced as soon as the output load reaches and begins to exceed 0.5 per unit load since even at this low level, the phase angle $\alpha$ is being retarded sufficiently so that the system moves towards the critical $\beta$ angle. Thus, as shown in FIG. 6 for a 0 power factor load, the operational point of the field effect transistor should be such that the resistance of the field effect transistor follows the relationship illustrated in curve 50.

Curve 57 shows the relationship between generator current and load current for a purely unity power factor load. Again, at no load, a generator current $I_g 0$ flows and represents the leading capacitor current being supplied to the filter capacitor. As the load is applied, the generator current increases continuously. There is no drop in generator current since there is no leading current being drawn to cancel the filter capacitor current. Thus, the generator current increases almost linearly with increases in output load. However, since the load current is not a lagging current, it does not have any tendency to retard the firing angle of the SCR's at low load levels. Only at high loads will one of the feedback systems retard the firing angle for the rectifiers in the inverting mode sufficiently to present miscommutation problems. Not until the load exceeds 1.25 per unit load is the firing angle of the SCR's in the inverting mode sufficiently retarded so that the system approaches the critical beta angle. Consequently, as illustrated in curve 54, of FIG. 6 at this point, it is necessary to reduce the feedback to avoid miscommutation due to the overload condition.

Curve 56 represents a curve showing the relationship between generator current and output load current for a power factor 0.75 lagging and represents a typical reference power factor one might choose for the system. That is, for power factors below this reference value of 0.75, it is desirable that a control signal be produced from the power factor sensing network which will reduce the level of the load at which the feedback reduction begins. On the other hand, at power factors above 0.75 no control signal from the power factor sensing network is required. Thus, the generator current flowing at rated output load for a 0.75 lagging power factor circuit is utilized as the reference current. Currents above this value, which is indicated at $I_{gr}$ in FIG. 7 will produce no response from the power factor circuit and will have no effect in recalibrating the F.E.T. Generator currents below this level, however, will produce a unidirectional voltage which is proportional to the difference between the actual generator current flowing and the magnitude of the generator current $I_{gr}$ at per unit load and 0.75 power factor. This unidirectional current is then added to the voltage proportional to the output load current to control the F.E.T. and the amount of feedback to the cycloconverter. The relative amplitudes of the signals and their polarities are such that when added, the operating point of the F.E.T. is such that the F.E.T. resistance is varied at different load levels for different power factors.

FIG. 8 is a partial schematic diagram of a circuit for controlling the feedback and includes an F.E.T. for controlling the amount of the feedback as well as power factor sensing and load current sensing circuitry. Thus, FIG. 8 shows a generator 10 coupled to the converter stages, not shown, through leads 11. Generator 10 is shown as a three-phase generator symbolized by the three inductances marking the phase outputs 1-3. These phase outputs are coupled to the SCR's in the converter stage in the proper order with the SCR's being fired as designated by the numbers 1, 2, 3 for the particular SCR's. Coupled to the output of generator 10 is a current transformer 40 comprising individual current transformers 60, 61 and 62 coupled to leads 11 carrying the individual phase voltages from the generator. The outputs from the transformers 60, 61, 62 are coupled to rectifiers 63, 64 and 65 which form part of the rectifier filter circuit shown generally at 41. Rectifiers 63, 64 and 65 are so poled as to pass the negative alternations generator current flowing lines 11. The cathodes of each of these rectifiers are connected to the current transformers whereas respective anodes are connected together and coupled to an RC filter consisting of a resistor 66 and a capacitor 67 between the anodes and ground. A negative unidirectional output voltage which is proportional to the average current flowing in each of the output phases from generator is applied to filter 41. The voltage across filter capacitor 67 is therefore, of a magnitude proportional to the average current flowing from the generator and the polarity is as indicated by the plus or minus signs. This negative unidirectional voltage is applied to the power factor detecting circuits shown generally at 42 to produce at its output leads 68 a unidirectional voltage which is proportional to the difference between the average generator current flowing in lines 11 for given load and power factor and the generator current which flows when the load is rated load and the power factor of the load is 0.75 lagging. This output signal is applied via lead 68 to one end of the potentiometer 33 which controls F.E.T. 31 connected in the feedback path of the cycloconverter.

Also connected to the upper end of the potentiometer 33 is a unidirectional signal which is proportional to the magnitude of the output load. To this end, the three-phase output from the cycloconverter denominated as ΦA, ΦB, ΦC are coupled by a three-phase current transformer 34 to a rectifier network 35. Three-phase current transformer 34 consists of individual current transformers 69, 70 and 71 coupled to lines ΦA, ΦB, ΦC. The output from the transformer are coupled to rectifiers 72, 73 and 74. Rectifier 72–74 have their anodes connected to the individual current transformer and the cathodes are tied together and connected through leads 75 to potentiometer 33. Thus, a positive unidirectional voltage appears at the output of rectifier assembly 35, the magnitude of which is proportional to the average load current flowing in the output leads ΦA, ΦB, and ΦC and hence, to the average load current which is flowing.

The two unidirectional signals on lines 68 and 75 control the resistance of F.E.T. 31 which has its gate electrode 76 connected to a slider 77 positioned along potentiometer 33. The source and drain electrodes 78 and 79 of the field effect transistor are connected in shunt between a ground terminal and the output of a blocking filter 30 which passes the 3rd and 5th harmonics of the fundamental output sinusoidal voltage from the converter. Blocking filter 30 consists of a Twin-Tee filter comprising two series resistors 79 and 80 connected between line ΦA and the F.E.T. and a capacitor 81 connected between the junction of resistors 79, 80 and ground. A second Tee network comprising the two series connected capacitors 82 and 83 connected in shunt with resistors 79 and 80 and resistor 84 connected between the junction of capacitors 82 and 83 and ground. The network consisting of these two Tee configurations is characterized by the fact that at the selected frequency, the network will pass all frequencies except the selected frequency. Thus, for example, if the cycloconverter is one which converts an incoming voltage from the generator of varying frequency to produce an output frequency of 400 cycles, as would be required for an aircraft power system, then Twin-Tee filter 30 is designed to block the 400-cycle fundamental so that the signal passing through this filter contains no 400-cycle component but contains only the harmonics of the 400-cycle component.

This wave shaping feedbacks signal is applied through a voltage divider 88 and a lead 89 to the input terminal of an operational amplifier 90 where it is combined with feedback signals from other feedback loops such as the 400-cycle DC feedback etc. to produce an output which is the sum of these feedback signals and which is applied through lead 91 to a modulator in the converter to control the firing of the various SCR's to produce the desired wave characteristics. The other feedbacks may, for example, be a 400-cycle feedback, the purpose of which is to help the transient response of the system so that if the load increases, a feedback signal is provided to increase the output so that the output voltage is maintained substantially constant with load. In addition, another feedback may be a signal proportional to the DC component in the output. That is, it is desirable that the output be completely sinusoidal having no DC component. However, since the output wave is constituted of a plurality of DC segments produced by the SCR's, it is obvious that a DC component may appear at the output. It may be desirable, therefore, to sense the magnitude of the DC and provide a feedback loop to reduce the DC component. In summary, the feedback reducing circuitry which is the subject of the instant invention is one which is applied to a high-gain, fast response (low time constant) feedback loop in which the harmonics in the output wave are fed back to improve the waveform. It should be understood, however, that this particular feedback loop may be in addition to other feedback loops which are also present in the cycloconverter system.

The power factor sensing circuits shown generally at 42 consist of a network in which the negative unidirectional voltage representing the average generator current is compared to a reference voltage which represents the generator current at per unit rated current load at 0.75 power factor and produces an output voltage which is proportional to the difference between the generator current and the reference generator current. To this end, the unidirectional voltage at the output of filter capacitor 67 is applied to a base NPN transistor 92 the emitter of which is connected to the negative terminal −V of a source of supply voltage and the collector of which is connected through suitable resistors to the positive terminal of the voltage source. A reference voltage device such as the Zener diode 93 is connected directly to junction of a pair of resistors 94 and 95 connected between the emitter and the −V supply terminal. Zener diode 93 clamps the emitter voltage at a predetermined level which represents the generator current at 1.0 per unit load, i.e. (rated load current) at 0.75 power factor. If the average generator current exceeds the generator current at per unit load at 0.75 power factor, then the negative unidirectional voltage at the output of rectifier 41 and appearing across filter capacitor 67 is more negative than the negative voltage established at the emitter by Zener 93. As a result, the base-emitter junction of transistor 92 is reverse biased and there is no output from the transistor. If the generator current drops below the value at per unit load at 0.75 power factor, then the negative unidirectional output of rectifier 41 which appears across the capacitor 67 is less negative than the voltage at the emitter, thereby forward biasing the base-emitter junction of transistor 42 causing current to flow and producing an output voltage which is proportional to the difference between the Zener voltage at the emitter and the voltage at the output of the filter capacitor 67. It can be seen therefore, that there is produced at the output of the transistor 92 a unidirectional voltage which is proportional to the difference between the generator current flowing in output leads 11 and the reference generator current at per unit load current at 0.75 power factor.

The negative going DC voltage at the collector of transistor 92 is coupled directly to the base of an NPN transistor 97 which has its emitter connected to the positive terminal +V of the supply voltage and its collector connected to the output lead 68 and the upper terminal of the F.E.T. control potentiometer 33. Transistor 97 is an amplifying and inverting transistor so that output voltage at lead 68 is a positive unidirectional voltage the magnitude of which is proportional to the difference between the actual generator current and reference generator current at 1.0 per unit load at 0.75 power factor. It can be seen therefore, that an output signal is produced from the power factor detecting circuit 42 which is added to the signal driven into conduction to reduce the feedback load levels which depend on the power factor. Thus, if the power factor of the output load is below the reference power factor, which in this instance was illustrated at 0.75 power factor, the F.E.T. reduces the feedback at lower load levels. By this means, the feedback controlling F.E.T. transistor has its operating point recalibrated so that the F.E.T. begins to conduct and reduce the amount of feedback at different load levels depending upon the power factor of the load.

It will be apparent from examining the curves of FIG. 7 that there is a range of values of load current for a unity power factor load (from 0 to about 0.6 per unit load) where the generator current drawn by a unitary power factor load is less than the reference generator current $I_{gr}$ chosen for the reference power factor of 0.75 power factor load at per unit load current. Obviously, if the generator current for a unitary power factor load drops below the reference current load, there will be an output signal from the power factor detecting circuit 42 which is applied to the F.E.T. controlling potentiometer 33. This would tend to recalibrate the operating point of the F.E.T. transistor. However, the gain of the transistor amplifiers forming part of the power factor detecting circuit 42 is such that the maximum output of the circuit (which occurs obviously at 0.5 per unit load and 0 power factor where $I_G$ goes to zero) does not exceed the output from the load current sensing circuit at 0.75 per unit load so that the sum of the voltages appearing at the F.E.T. potentiometer is not sufficient to cause the F.E.T. to conduct and reduce the feedback.

For loads having power factor between 0.75 and unity power factor the circuit will not reduce the gain until the output load exceeds 1.25 per unit or the like. However, as the load power factor drops below the predetermined reference power factor, which in this instance has been made 0.75 lagging power factor, the negative unidirectional voltage from rectifier filter 41 is always less than the reference voltage established by Zener diode 93 so that the power factor sensing circuit 42 produces an output voltage for all ranges of loads. Thus, as shown by curve 52 of FIG. 6 at a power factor of 0.5 lagging, the output from the detecting circuit 42 is sufficiently large so that the sum of the unidirectional voltage representing the power factor at 0.5 lagging and the voltage representing the average of the output load is sufficiently great to initiate conduction of the field effect transistor whenever the load reaches 1.0 per unit load or rated current. As the power factor drops to lower values and the generator current drops correspondingly, the output from the power factor sensing circuit becomes proportionately greater since the difference between the actual generator current being drawn and the reference generator current at 0.75 lagging power factor and 1.0 per unit load becomes greater. As a result, the critical voltage necessary to cause F.E.T. 31 to become conducting is reached at lower values of the output load until at 0 power factor load the field effect transistor begins to reduce the feedback as soon as the load exceeds 0.5 per unit load, or half of the rated load. It will also be obvious that below 0.5 unit load, no feedback reducing is necessary since below this load value the generator current is a leading current supplying the capacitor filter current. A leading current, unless very large, does not introduce miscommutation problems. Thus, at 0 power factor, output of the power factor circuit 42 is at its maximum which, as pointed out before, is equivalent to a magnitude to the output load voltage at 0.75 per unit load, so that the sum of the voltages at 0.5 per unit load and 0 power factor is the same as it is for a load 1.25 at unit power factor. In other words, the sum of the two voltages is equal to the critical voltage required to cause the F.E.T. to conduct for these various combinations of power factor and load.

It will be seen therefore, that an arrangement has been provided for use with a cycloconverter of the type utilizing phase controlled SCR's in which the amount of feedback supplied to the cycloconverter is a high-gain, high-speed loop is selectively controlled in response both to the output load current and the power factor of the load to reduce the gain of the loop whenever the load and/or power factor conditions are such that the SCR's in the converter are operating near the critical β angle. The feedback is reduced sufficiently to eliminate or minimize system preturbations or disturbances which are likely to cause miscommutations in the converter. This is achieved by sensing both the output load current as well as the power factor and producing signals responsive thereto which are combined in such a manner that a voltage responsive variable resistance device is recalibrated and has its operating point shifted to become effective to reduce the feedback for various combinations of loads and power factor. The invention further is directed towards an arrangement in which the power factor of the load is sensed indirectly by a simple and effective circuit in which the magnitude of the generator current is sensed and compared to a reference level to determine from the relative values of the generator current and the reference generator current what the power factor of the load current is.

This invention, as described above, is not limited to the particular details of the embodiments illustrated there. It is contemplated that various modifications and applications thereof will be apparent to those skilled in the art. It is, therefore, intended that the appended claims cover such modifications as fall within the spirit and scope of this invention.

What I claim as new and desire to be secured by Letters Patent of the United States is:

1. A frequency conversion system for use with a source of alternating waves of varying, indeterminate, frequency comprising frequency conversion means for producing constant frequency output waves to supply constant frequency output power to a load, said conversion means including a number of gated, switching devices responsive to the varying frequency wave, phase controlled gating means operatively coupled to said source of varying frequency waves, a source of reference waves of the desired output frequency also coupled to said gating means for gating selected ones of said switch means into conduction at selected points in the phase of the alternations of the variable frequency waves to produce the constant frequency output waves, feedback means coupled from the output of said converter to said phase controlled gating means to control the gating of said switch means and the points in the phase of the alternations at which the switch means conduct in response to the output waves from said converter, and electrical control means responsive both to the magnitude and the power factor of the electrical power supplied to the load form the converter to vary the feedback and prevent miscommutation of said switching devices as the magnitude and power factor of the output to the load vary.

2. The frequency conversion system according to claim 1 including means to produce a first electrical signal proportional to the magnitude of the power supplied to the load, means to produce a second electrical signal proportional to the power factor of the power supplied to the load, and means to vary the said feedback in response to said first and second signals to control the amount of feedback for various combinations of magnitude and power factor whereby reduction of feedback begins at lower load power magnitudes for lower power factors.

3. The system according to claim 1 including means to produce an electrical signal proportional both to the magnitude and power factor of the power supplied to the load, means to apply said signal to said feedback means to control the feedback for various combinations of output magnitude and power factor so that reduction of feedback begins at lower output levels for lower power factors.

4. The system according to claim 1 including, means to produce a signal proportional to the magnitude and power factor of the output power means coupling electrically variable resistive means in said feedback means, said signal to said variable resistive means to vary the resistance thereof and vary the feedback in response to the magnitude and power factor of the power supplied to the load.

5. The system according to claim 4 wherein said resistive means is connected in said feedback path to shunt a portion of the feedback signal to ground.

6. The system according to claim 4 wherein said electrically variable resistive means comprises a field effect transistor connected to have its source and drain path connected between the feedback path and ground, and means to couple the electrical signal proportional to the magnitude and power factor of the power supplied to the load to the gate electrode of said field effect transistor to vary the amount of feedback by varying the shunting resistance of the field effect transistor.

7. The system, according to claim 1 including first means for producing a unidirectional signal proportional to the magnitude of the output from the frequency conversion means, second means coupled to the converter for producing a unidirectional signal proportional to the difference between the power factor of the output power and a predetermined reference power factor, means to combine the two unidirectional signals and to couple said signals to said feedback means to control the feedback successively lower load levels as the power factor of the load is reduced below the reference power factor.

8. The system, according to claim 1 including means to sense the power factor of the power to the load from the magnitude of the varying frequency alternating waves including, means for sensing the magnitude of the varying frequency alternating waves and producing a signal proportional to the magnitude of the varying frequency alternating wave.

9. The system according to claim 8, wherein the magnitude of the varying frequency alternating wave is sensed to produce a signal proportional thereto, and means for comparing the signal proportional to the magnitude of the wave to a reference signal representing a reference power factor to produce a signal proportional to the difference between the power factor of the load power and the reference power factor.

10. In a cycloconverter a combination of a source of alternating current power of varying, indeterminate frequency, converter means coupled between the said source, and load for producing constant frequency output electrical power for the load, said output of converter means including gated power switching means for the power source, phase controlled gating means operatively coupled to said power source to a source of reference signals, and to said gated switch means for gating on selected ones of said switch means to cause them to conduct current at selected points in the phase of the alternations of variable frequency power to produce the constant frequency output wave, feedback means coupled from the output of said converter to said phase controlled gating means to control the gating of said switch means and the points in the phase of the alternations at which the switch means conduct a response to the output form said converter, means in said feedback path to reduce the amount of feedback, means coupled to the power source to produce a first signal proportional to power factor from magnitude of output from the power source, means to generate a second signal proportional to the magnitude of the power supplied to the load, means to combine said first and second signals and couple said combined signal to the feedback controlling means in said feedback means to reduce the amount of feedback and eliminate miscommutation of the switching means with variations in both power factor and load from desired levels.

11. The system, according to claim 10 in which said switching means comprises groups of oppositely poled silicon controlled rectifier means.

12. The system, according to claim 10 wherein said means for controlling the feedback comprises electrically variable resistive means.

13. The system according to claim 12 in which said electrically variable resistive means comprises a field effect transistor having its source and drain path connected to shunt portions of the feedback signal and having the electrical signals applied to its gate electrode to control the resistance of the transistor in response to the signals representing the load and power factor.

14. The system according to claim 10 including means to sense the magnitude of the varying frequency output current from the power source to produce a first signal proportional to the difference between the power factor of the power supplied to the load, and a predetermined reference power factor, means to apply said signal to said feedback controlling means to initiate reduction of the feedback at lower values of the output power level as the power factor is reduced below the reference power factor value.

15. The system according to claim 10 wherein the alternating output current form the power source is rectified to produce a unidirectional signal proportional to the power factor of the power delivered to the load, means for comparing the unidirectional signal to a reference signal proportional to a reference power factor to determine whether the power factor is less than a reference power factor and producing a signal proportional to this difference, means to couple the signal proportional to the difference between the power factor and the reference power factor to said feedback controlling means to vary the point at which feedback reduction begins to produce reduction at lower loads with reduced power factor.

16. The system according to claim 13 wherein the signals proportional to the output load and power factor are applied to the gate electrode of said field effect transistor to change the resistance of the device and initiate reduction of the feedback at different load levels, with the load at which feedback begins being reduced as the power factor of the load is lowered.

17. The system, according to claim 14 including wherein the means to produce a first signal proportional to the difference between the load power factor and a reference power factor from the magnitude of the output from the power source includes, means coupled to the output of said source to rectify the alternating current to produce a unidirectional signal proportional to the amplitude of the varying frequency output current from the source, means to compare the unidirectional signal to a reference signal proportional to the magnitude of the current from the source at a reference power factor, means to produce a control signal if the load power factor is less than the reference power factor with the magnitude of said control signal being proportional to the difference, and means to apply the control signal to the feedback reducing means along with the said signal proportional to the magnitude of the output load to reduce the feedback signal at progressively lower load levels as the poser factor of the load drops below the reference power factor.

18. The system according to claim 17 wherein said means to compare the unidirectional signal proportional to the magnitude of the varying frequency alternating wave consists of transistor means having the unidirectional signal coupled to the base electrode thereof and a Zener diode coupled to the emitter electrode thereof with said Zener diode clamping the emitter at a level representing the reference signal level for the reference power factor whereby the output from said transistor means is proportional to the difference between the load power factor and the reference power factor.

19. The system according to claim 17 wherein said feedback controlling means comprises a field effect transistor connected to shunt portions of the feedback signal as the resistance thereof is varied, and means for coupling the signal proportional to the power factor and the signal proportional to the load magnitude to the gate electrode of the field effect transistor to initiate variation of the resistance at lower load levels as the power factor of the power delivered to the load is reduced below the reference value.